(12) United States Patent
van Wyk Becker et al.

(10) Patent No.: US 9,849,737 B2
(45) Date of Patent: Dec. 26, 2017

(54) DEVICE FOR CONTROLLING THE PRESSURE IN A VEHICLE TYRE

(71) Applicant: Brian Bacon, Cape Town (ZA)

(72) Inventors: Pierre van Wyk Becker, Cape Town (ZA); Mark Gregory Marshall, Cape Town (ZA)

(73) Assignee: PRESSURERITE (PTY) LTD, Cape Town (ZA)

( * ) Notice: Subject to any disclaimer, the term of this patent is extended or adjusted under 35 U.S.C. 154(b) by 306 days.

(21) Appl. No.: 14/414,476

(22) PCT Filed: Jun. 10, 2013

(86) PCT No.: PCT/IB2013/054732
§ 371 (c)(1),
(2) Date: Jan. 13, 2015

(87) PCT Pub. No.: WO2014/009822
PCT Pub. Date: Jan. 16, 2014

(65) Prior Publication Data
US 2015/0191058 A1    Jul. 9, 2015

(30) Foreign Application Priority Data
Jul. 13, 2012 (ZA) .................................. 2012/05211

(51) Int. Cl.
  *B60C 23/12*   (2006.01)
  *B60C 23/04*   (2006.01)
(52) U.S. Cl.
  CPC .......... *B60C 23/12* (2013.01); *B60C 23/0408* (2013.01)

(58) Field of Classification Search
  CPC ...... B60C 23/12; B60C 23/0408; B60C 23/04
  (Continued)

(56) References Cited

U.S. PATENT DOCUMENTS

| 1,571,072 A | 1/1926 | Talbert |
| 1,744,405 A | 1/1930 | McCord |

(Continued)

FOREIGN PATENT DOCUMENTS

| FR | 761011 A | 3/1934 |
| WO | WO 02/36369 A1 | 5/2002 |

OTHER PUBLICATIONS

Written Opinion issued Sep. 23, 2013 in PCT/IB2013/054732.
International Search Report issued Nov. 28, 2002 in PCT/ZA02/00094.

*Primary Examiner* — S. Joseph Morano
*Assistant Examiner* — Jean Charleston
(74) *Attorney, Agent, or Firm* — Polsinelli PC

(57) ABSTRACT

A device for Controlling pressure is disclosed which comprises a pump (28) having opposed pistons (30) which reciprocate in cylinders (40) carried by a casing (38). The pistons (30) are at the outer ends of rings (50) which are themselves fitted to an eccentric (26). The eccentric (28) is integral with a clutch plate (24). A second clutch plate (22) is fixed to a non-rotating axle (18) which itself forms part of a hanging counterweight structure (20). A piston (84) pushes the eccentric and clutch plate (26, 24) against the clutch plate (22) thereby to prevent the eccentric (26) tire from rotating with the rings (50) upon a sensor detecting that a tire has a low pressure in it. Stopping the eccentric initiates the pumping action of the pistons (30).

19 Claims, 11 Drawing Sheets

(58) Field of Classification Search
USPC ............... 152/415, 418, 419, 424, 425, 426
See application file for complete search history.

(56) References Cited

U.S. PATENT DOCUMENTS

| | | | | |
|---|---|---|---|---|
| 5,505,080 | A * | 4/1996 | McGhee | B60C 23/12 |
| | | | | 116/34 R |
| 5,947,696 | A | 9/1999 | Baumgarten | |
| 7,013,931 | B2 * | 3/2006 | Toit | B60C 23/12 |
| | | | | 141/38 |
| 7,434,455 | B2 * | 10/2008 | Alff | B60C 23/003 |
| | | | | 152/415 |
| 7,882,731 | B1 * | 2/2011 | Franks | G01L 17/00 |
| | | | | 152/417 |
| 2004/0011445 | A1 * | 1/2004 | Harm | B60C 23/0408 |
| | | | | 152/152.1 |
| 2008/0156406 | A1 * | 7/2008 | Breed | B60C 23/041 |
| | | | | 152/415 |

* cited by examiner

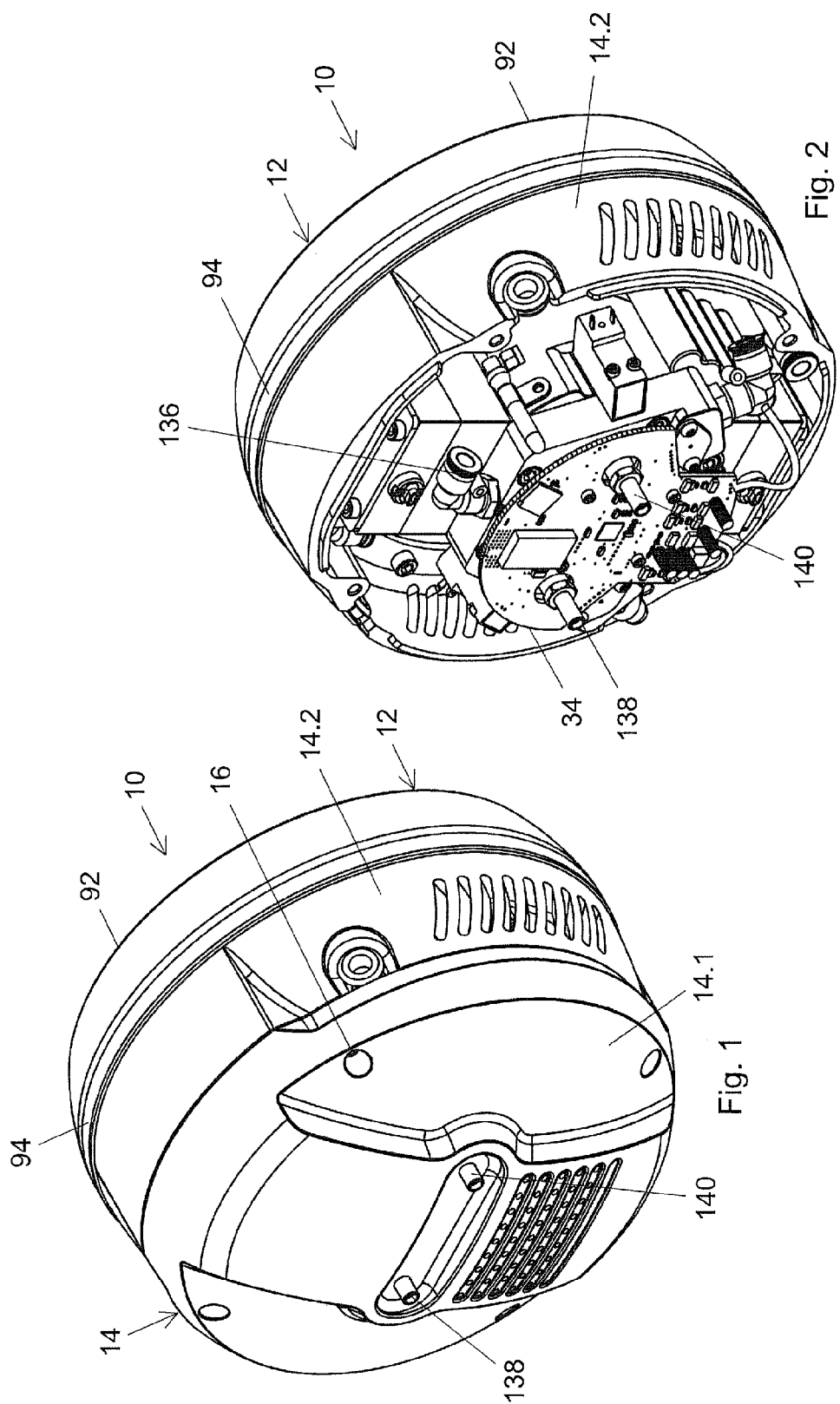

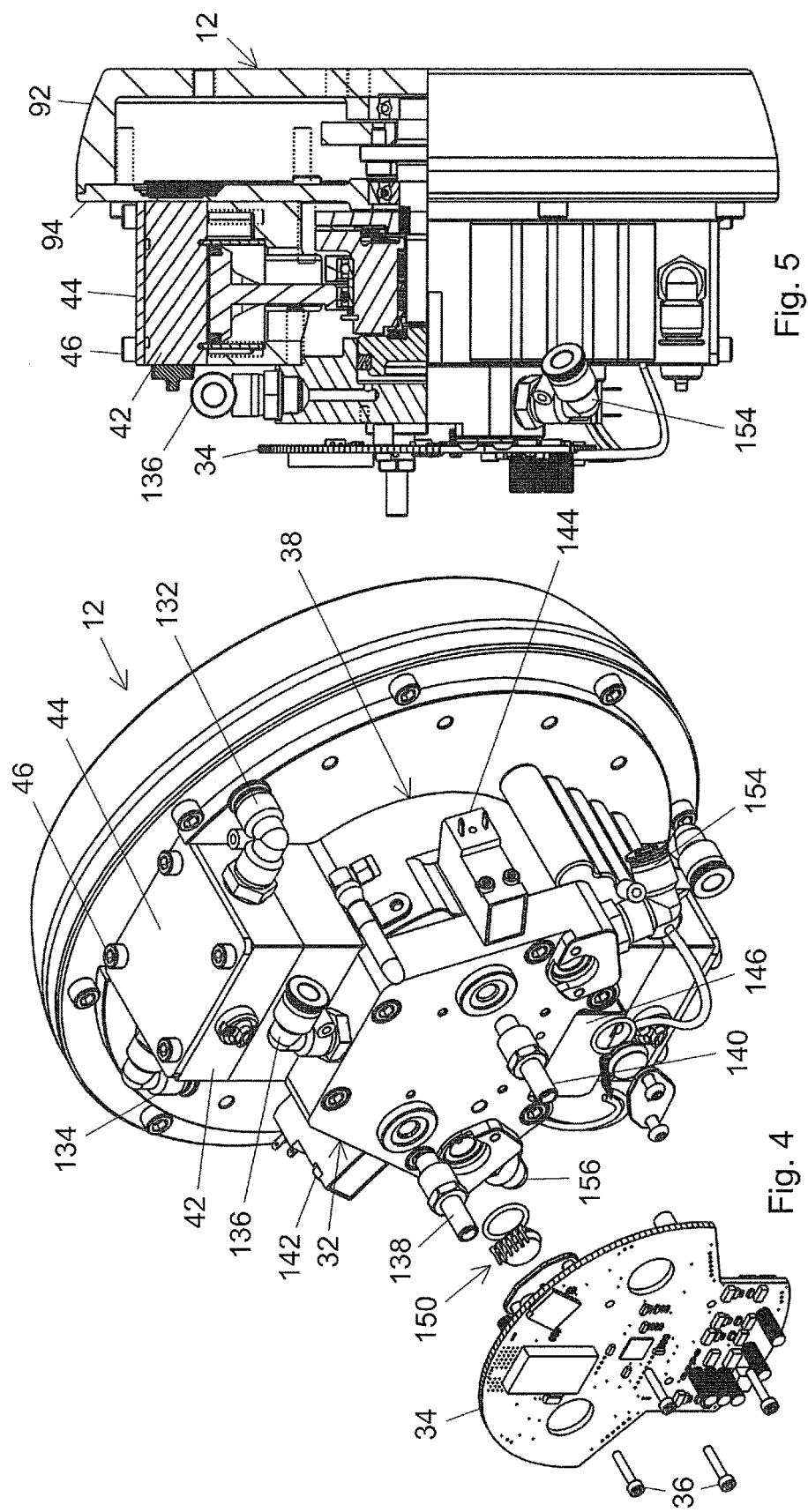

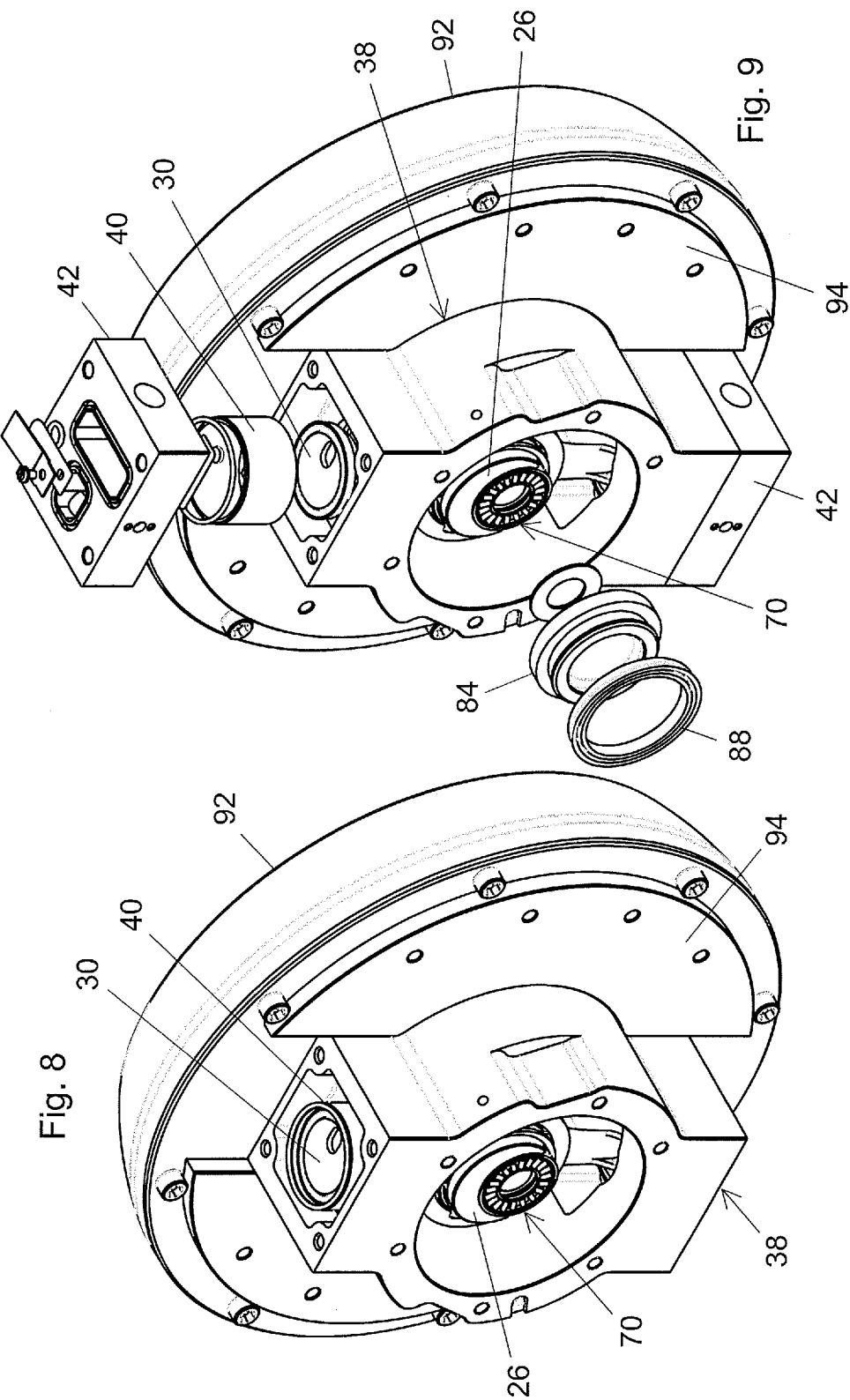

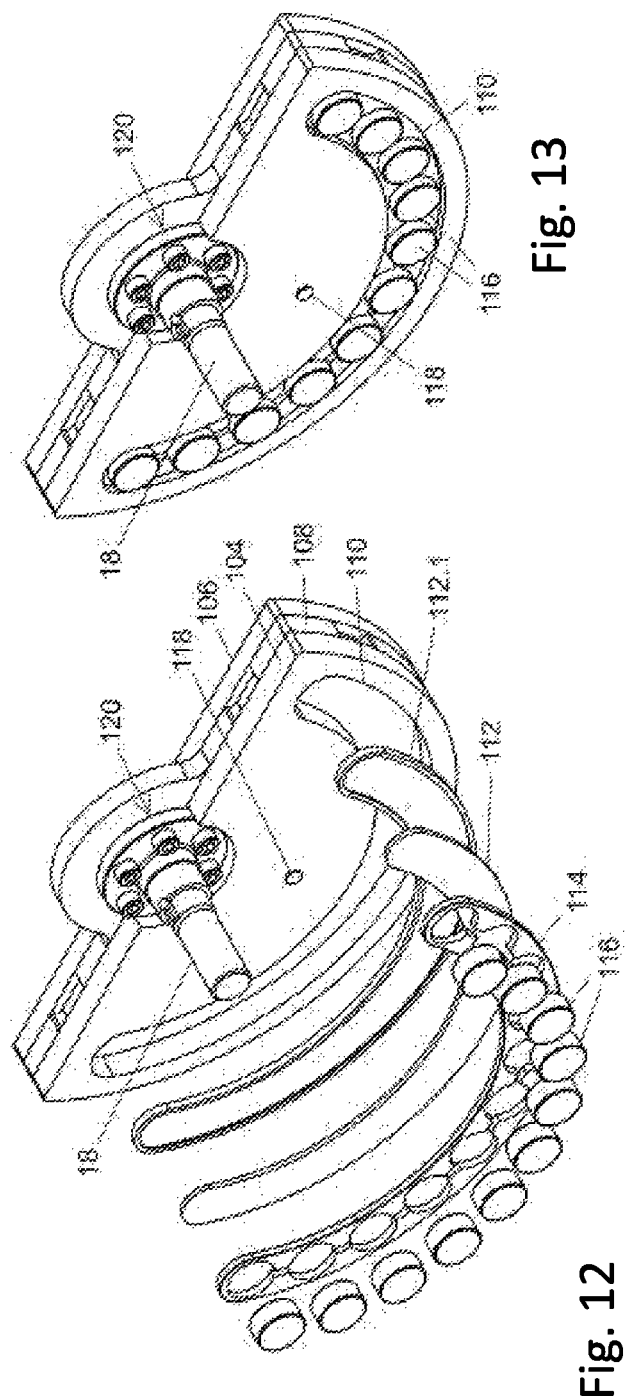

DEVICE FOR CONTROLLING THE PRESSURE IN A VEHICLE TYRE

CROSS REFERENCE TO RELATED APPLICATIONS

This application is a National Phase filing under 35 U.S.C. §371 of PCT/IB2013/054732 filed on Jun. 10, 2013; and this application claims priority to Application No. 2012/05211 filed in South Africa on Jul. 13, 2012, under 35 U.S.C. §119. The entire contents of each application are hereby incorporated by reference.

FIELD OF THE INVENTION

THIS INVENTION relates to a device for controlling the pressure in a vehicle tyre.

BACKGROUND TO THE INVENTION

The life of a tyre depends inter alia on it being inflated to the correct pressure at all times. Over inflation can cause tread wear and under inflation can cause tyre wall damage as well as tread wear. A device for inflating vehicle tyres is disclosed in U.S. Pat. No. 7,013,931 B2. This device is in an inoperative condition whilst the pressure in the tyre is above a predetermined minimum. More specifically the entire device, apart from a hanging, stationary counterweight, rotates with the vehicle's wheel whilst tyre pressure is above said predetermined minimum. All the parts of the device's pump rotate together in this condition and there is no air pumping action.

Upon a drop in tyre pressure being detected by a sensing and activating structure, a rotating clutch plate is moved axially by a shaft of the sensing device into contact with the stationary clutch plate and it is then prevented from rotating with the remainer of the device.

The pump of the device comprises an eccentric on said shaft and a connecting rod which, at a radially inner end, includes a ring which encircles the eccentric. The outer end of the connecting rod drives a plunger which is within a cylinder and which pumps air when required.

On a low tyre pressure being detected the clutch plate, the shaft and the eccentric cease to rotate. However, the part of the pump comprising the ring, the connecting rod, the plunger and the cylinder continue to rotate. The result is that the ring rotates about the eccentric and the plunger reciprocates in the cylinder pumping air to the tyre. Upon the sensing unit detecting that tyre pressure has reached an acceptable level, the shaft and the clutch plate return to their original position. Relative rotation, and hence the pumping action, cease.

The present invention provides an improved device which allows for both inflation and deflation of the tyre to maintain the correct pressure.

BRIEF DESCRIPTION OF THE INVENTION

According to one aspect of the present invention there is provided a device for controlling tyre pressure, the device comprising a casing structure which in use rotates with the wheel hub, a counterweight assembly which is mounted on the casing structure by way of a bearing so that the counterweight assembly hangs and does not rotate with the casing structure, a fixed axle forming part of the counterweight assembly, a first clutch plate, the first clutch plate being fixed to said axle, a second clutch plate, the second clutch plate, in the device's non-pumping condition, rotating with said casing structure, means for detecting tyre pressure, means for forcing said first and second clutch plates together to engage the clutch upon a tyre "under pressure" being detected so that said second clutch plate stops rotating, and an air pump which rotates with said casing structure and which includes an air pumping piston and a pump driving element for reciprocating said piston to pump air to the tyre only when said clutch is engaged, said element rotating with said casing structure whilst the clutch is disengaged.

The device can comprise first and second valves respectively for connection to the air inlets of the tyres of a set of dual tyres and a third valve for connection to atmosphere, all three valves being connected through a manifold to a chamber one bounding wall of which is in the form of an activating piston which, on said chamber being pressurised, moves to force said first and second clutch plates together.

Said second clutch plate is preferably integral with an eccentric through which said fixed axle passes, and there is a thrust bearing between said activating piston and the end of said eccentric. In this form the air pumping piston of the air pump can include a piston rod which has a ring at the end thereof remote from the piston, said eccentric being within said ring and constituting said pump driving element.

Spring means may be provided between said clutch plates for holding the clutch plates apart in the non-pumping condition.

To provide a source of power the device can include a plurality of coils carried by the casing structure and a plurality of magnets carried by the counterweight assembly, the magnets and coils constituting an alternator.

There is preferably a monitor for detecting the rate of rotation of the wheel hub and means for preventing activation of said means for forcing said clutch plates together until a preset minimum rate of rotation has be reached. The monitor can comprise a Hall effect switch which is carried by the casing structure, a magnet which is carried by the counterweight assembly, and means for counting the rate of activation of the Hall effect switch.

In a preferred form the device comprises an air flow control valve for connection to a tyre, a tyre pressure sensor for opening said valve upon the sensor detecting that the tyre pressure is below a predetermined value, a chamber and a piston forming one wall of said chamber, opening of said valve permitting air at tyre pressure to enter the chamber and move said piston which piston constitutes the means for forcing the first and second clutch plates together to initiate pumping.

There can be a further air flow control valve which is opened by said sensor to connect the tyre to atmosphere via said chamber upon the sensor detecting that the tyre pressure is above a predetermined maximum value.

To enable the device to control the pressure in the tyres of a set of dual tyres it can comprise a second air flow control valve and a second tyre pressure sensor.

According to a further aspect of the present invention there is provided a device for controlling a vehicle's tyre pressure, the device comprising a microprocessor, a first pressure sensor for detecting the pressure in a first tyre of a set of dual tyres and feeding signals representative of detected tyre pressure to said microprocessor, a second pressure sensor for detecting the pressure in a second tyre of the set of dual tyres and feeding signals representative of detected tyre pressure to said microprocessor, a manifold, a first electrically operated valve for connection between said first tyre and the manifold, a second electrically operated valve for connection between said second tyre and the manifold, means for engaging a pump upon one of said pressure sensors detecting a tyre pressure below a predetermined value to pump air to said manifold and for opening the respective one of said first and second valves so that air can flow from the manifold to the below pressure tyre, and a third electrically operated valve for connecting said manifold to atmosphere to evacuate said manifold upon the pressure of said below pressure tyre reaching the requisite value.

The device as claimed can include characterised by means for detecting the road speed of a vehicle and feeding a signal representative of vehicle road speed to the microprocessor, said pump being prevented from engaging until the detected road speed exceeds a predetermined value.

It is preferred that said first, second and third valves be solenoid valves and that a dual voltage power supply be provided, a higher voltage being supplied to shift the solenoid of a valve between the open and closed positions of the valve and a lower voltage being supplied to hold the solenoid in the position to which it has been shifted.

The device can include an accelerometer for detecting vibrations and for feeding to the microprocessor signals representative of the detected vibrations, the microprocessor producing an alarm signal when a vibration of greater than a predetermined magnitude is detected.

The device can further include a printed circuit board and a temperature sensor for sensing the temperature of the printed circuit board and feeding a signal to the microprocessor which is indicative of the temperature of the board. The device can also comprise a temperature sensor for sensing the temperature of the hub on which said dual tyres are mounted and feeding a signal to the microprocessor which is indicative of the temperature of the hub.

A radio frequency transmitter may also be provided.

BRIEF DESCRIPTION OF THE DRAWINGS

For a better understanding of the present invention, and to show how the same may be carried into effect, reference will now be made, by way of example, to the accompanying drawings in which:

FIG. 1 is a pictorial view of a device for controlling tyre pressure;

FIG. 2 is a pictorial view of the device of FIG. 1 with a cover removed;

FIG. 4 is a view similar to FIG. 2 but with certain parts shown "exploded";

FIG. 5 is, in the top half, a section through the device and, in the bottom half, a side elevation of the device;

FIGS. 8 and 9 are views corresponding to those of FIGS. 6 and 7 but with still further components removed;

FIGS. 12 and 13 are respectively views of the "exploded" and assembled counterweight assembly;

DETAILED DESCRIPTION OF THE DRAWINGS

Figure 3:
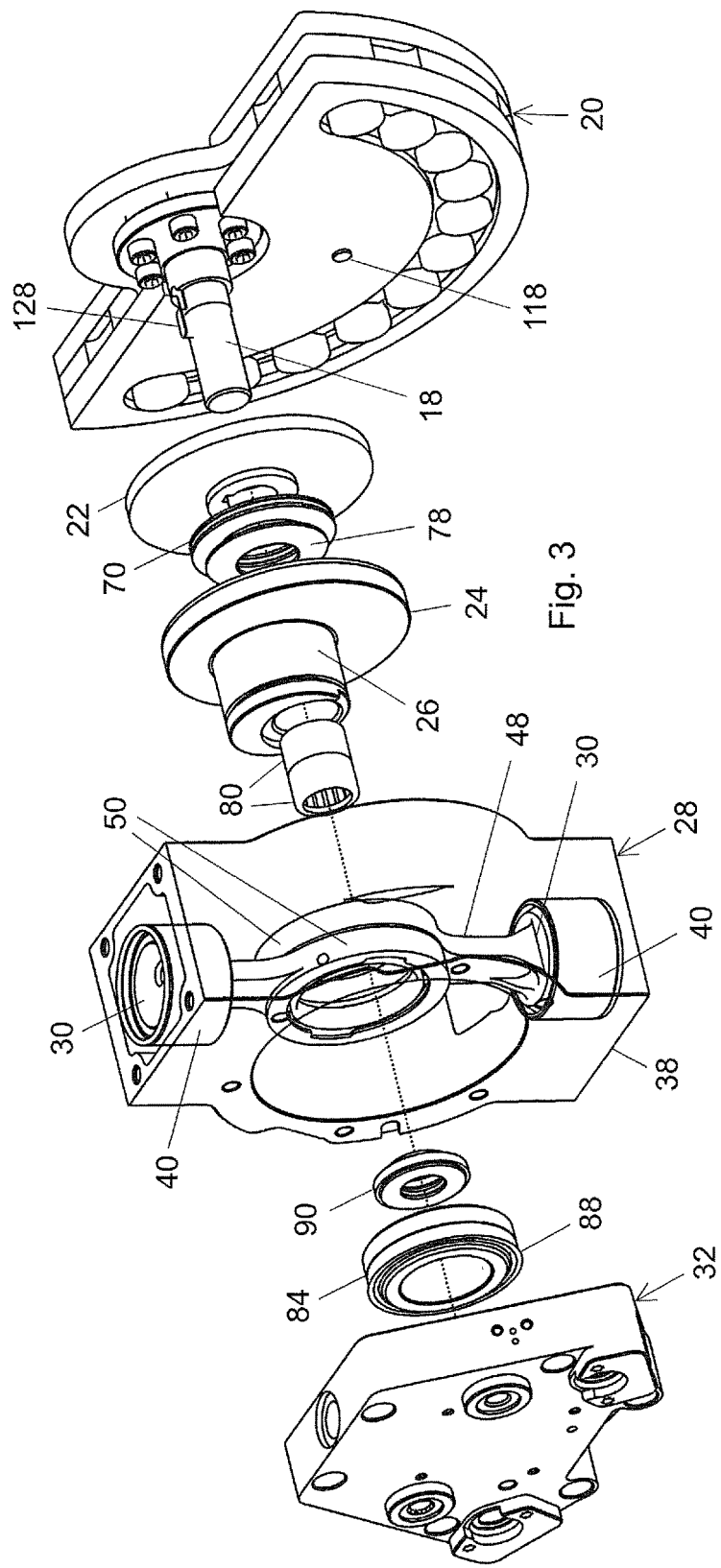
FIG. 3 is an "exploded" view showing the main parts of the device.

Referring firstly to FIGS. 1 and 2, the device 10 illustrated has, as its main function, ensuring that the double tyres of a road vehicle are maintained at the correct pressure. As a subsidiary feature the device can provide information concerning the condition of the tyres.

The device 10 includes a base structure 12 and a cover 14 which is secured by studs 16 to the base structure 12. The cover 14 comprises a dome-shaped part 14.1 and a sleeve 14.2.

The main components of the device are shown in FIG. 3 and are a non-rotatable axle 18, a counterweight assembly 20, a first clutch plate 22, a second clutch plate 24 which incorporates an eccentric 26, an air pump 28 which includes opposed pistons 30, and a manifold 32. Experimental work has shown that sufficient air can be pumped by a single piston 30. Consequently, if desired, the second piston 30 can be omitted.

In FIGS. 2 and 4 the cover part 14.1 has been removed and in FIG. 4 certain components have been separated from the reminder of the base structure 12. A printed circuit board is shown at 34 and this is secured by studs 36 to the manifold 32.

Turning now to FIGS. 6 to 9, the air pump 28 comprises a casing 38 which forms the mounting for two separate cylinders 40. The pistons 30 reciprocate in the cylinders 40. Cylinder heads 42 and closure plates 44 are secured by studs 46 to the casing 38.

The manifold 32 is secured to the casing 38 by studs 46.1.

Figure 11:
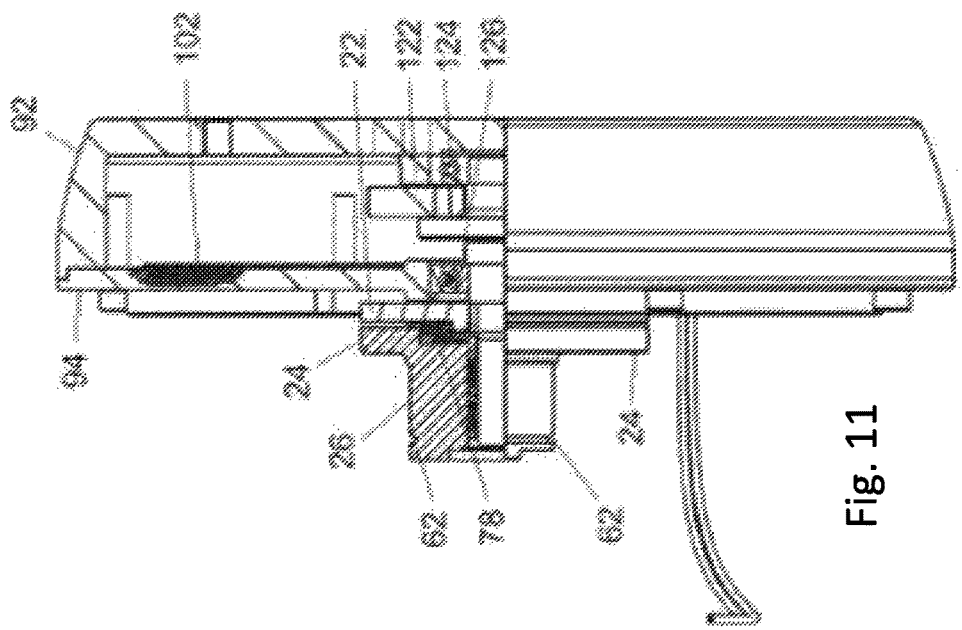
FIGS. 10 and 11 illustrate the clutch of the air pump.
Figure 10:
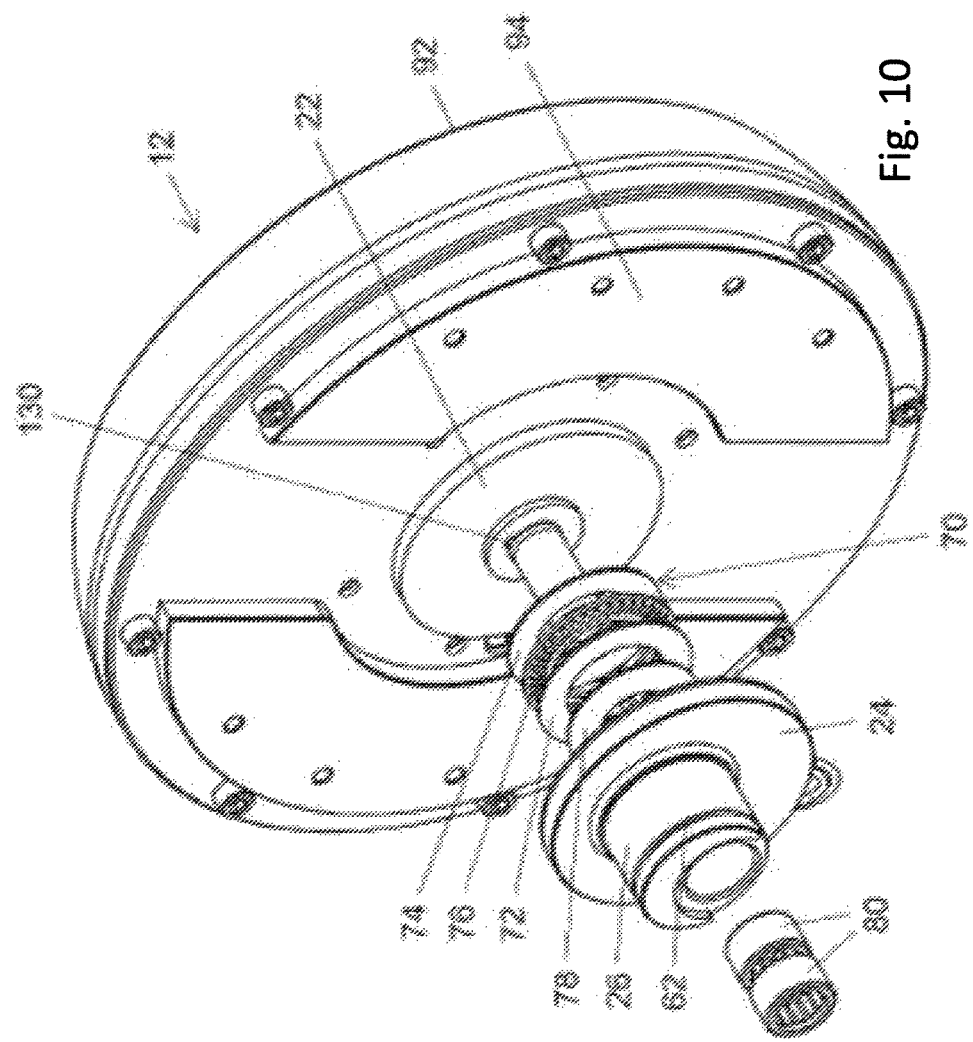

The drive mechanism of the air pump is illustrated in FIGS. 10 and 11. Each piston 30 is at one end of a connecting rod 48, there being a ring 50 at the other end of each rod 48. Each ring 50 has an internal bearing 52. The outer race 54 of each bearing 52 is secured to the ring 50 into which it is fitted and the inner race 56 is a tight fit on the eccentric 26. There is a spacer 58 between the two inner races 56. A circlip 60 in a groove 62 of the eccentric 26 and a further spacer 64 prevent axial movement of the inner races 56.

The clutch of the device is illustrated in detail in FIGS. 12 to 15 of the drawings. The plate 22 has a ring 66 of friction material secured to it, the ring 66 being close to the periphery of the plate 22. The ring 66 could if desired be secured to the plate 24. The plate 22 has a step in it thereby to provide a hub 68 which onto a roller thrust bearing 70 is fitted.

The races of the roller bearing 70 are designated 72 and 74 (see FIG. 12) and the cage and rollers are designated 76. A disc spring 78 is positioned in a recess of the plate 24 and bears on the race 72 of the bearing 70. The spring 78 pushes the plates 22 and 24 apart as will be described below.

Two needle roller bearings 80 are provided between the eccentric 26 and the axle 18. The needles of the bearings 80 are not shown in FIGS. 14 and 15.

Figure 15:
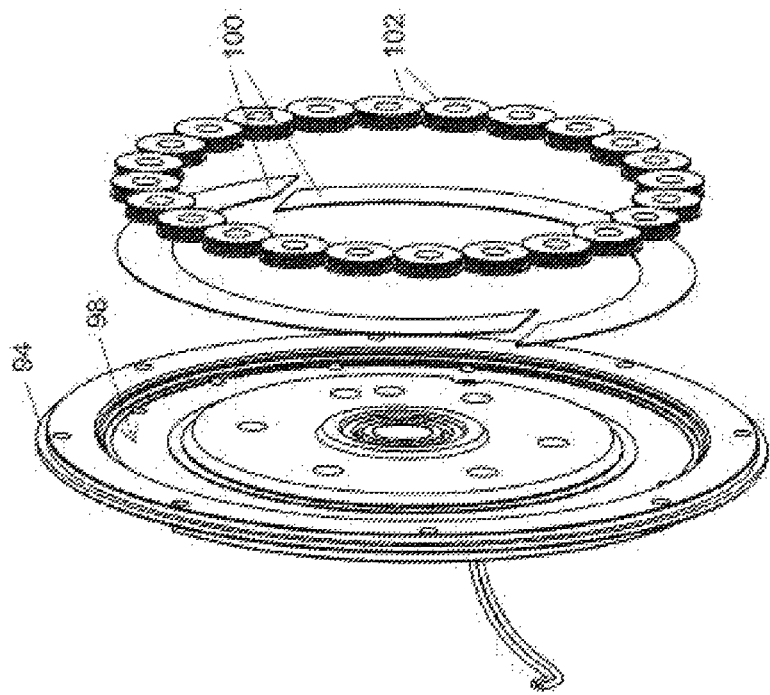
FIGS. 14 and 15 are assembled and "exploded" views respectively illustrating the backplate.
Figure 14:
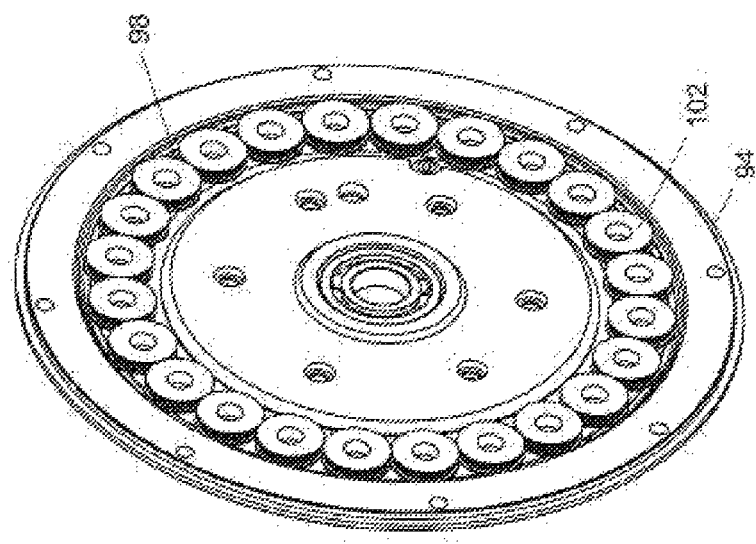
Figure 17:
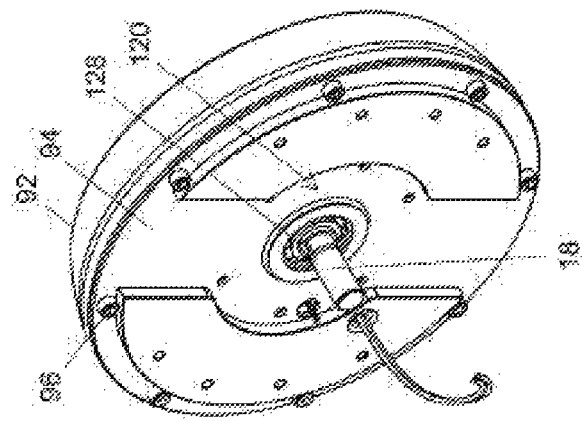
FIG. 17 is a pictorial view of the fully assembled counterweight assembly.
Figure 16:
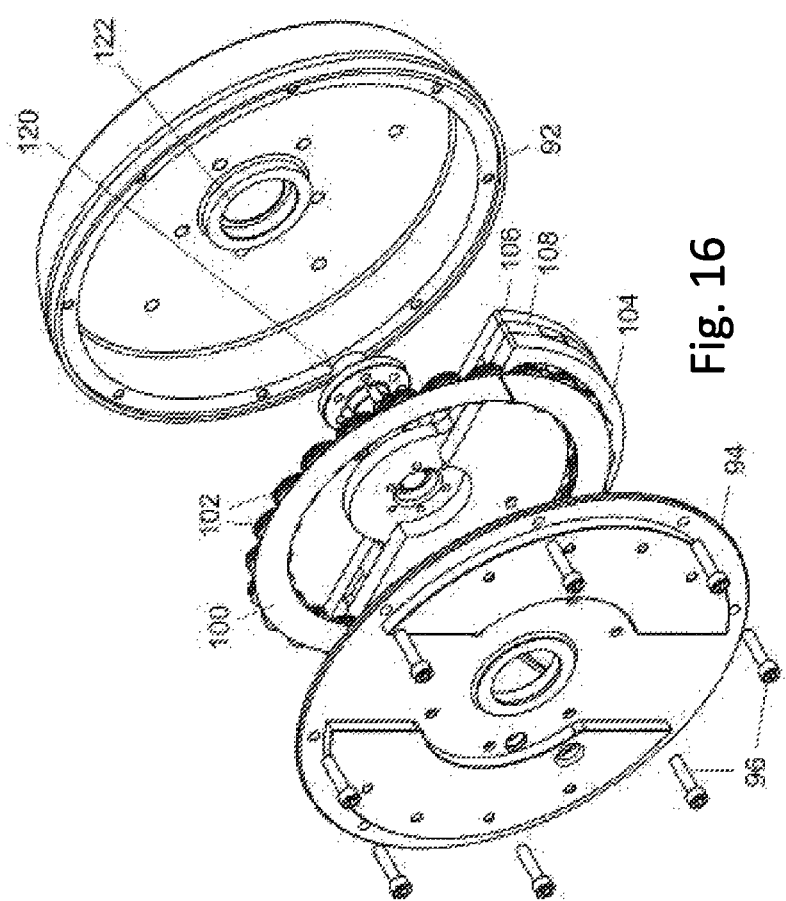
FIG. 16 is an "exploded" pictorial view of the counterweight assembly and the casings of the device.
Figure 18:
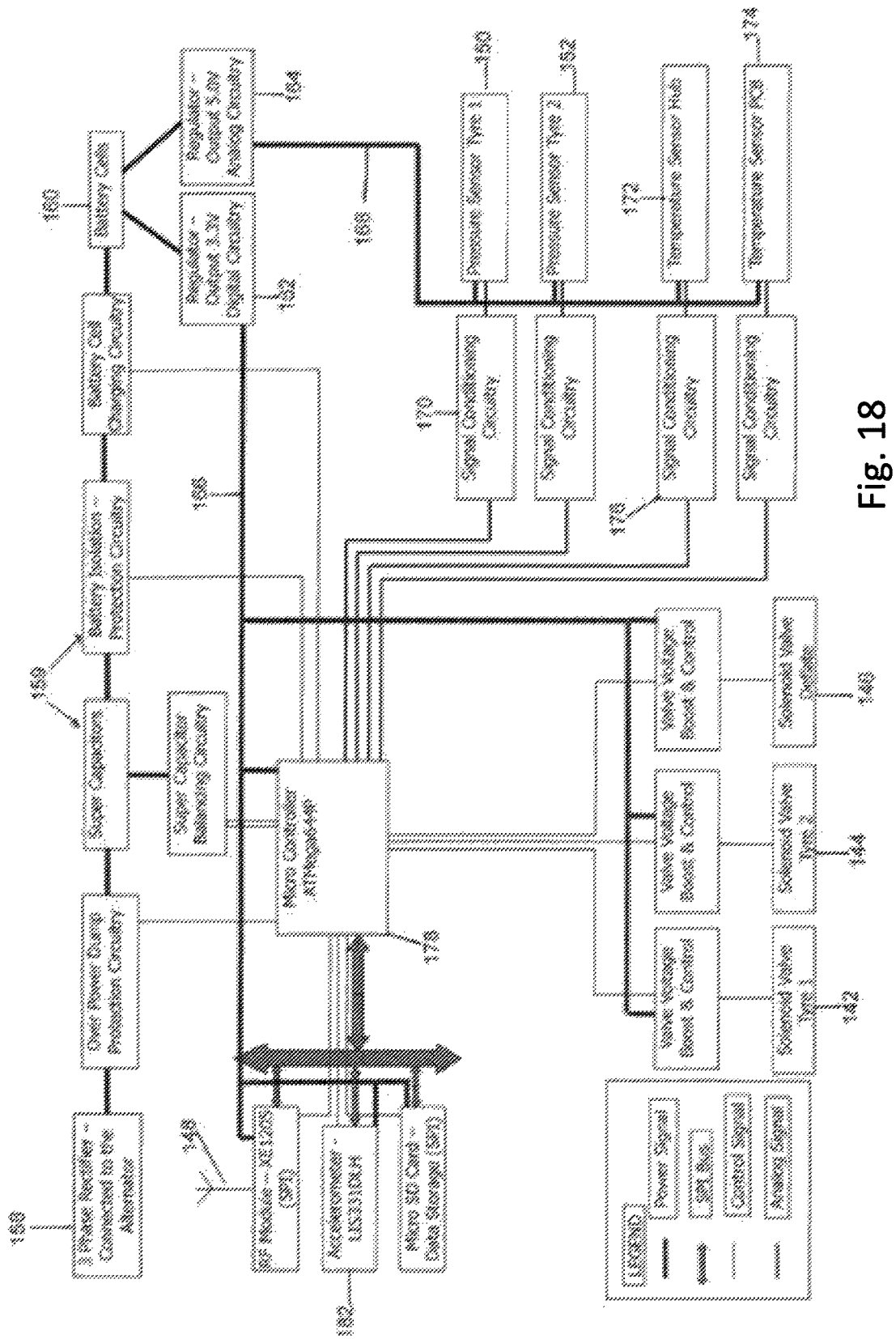
FIG. 18 is a block diagram.

The manifold 32, as best seen in FIGS. 14 and 15, has a recess 82 in the rear face thereof which forms a cylinder for a piston 84. An inlet to the recess 82 is shown at 86. A seal 88 encircles the piston 84 and there is a thrust bearing 90 between the piston 84 and the end of the eccentric 26.

The base structure 12, counterweight assembly 20 and the associated components of the device are shown in FIGS. 16 to 23. A dished backplate 92 is secured by a bracket (not shown) to the wheel hub and hence rotates with the hub. The counterweight assembly 20 is enclosed in the cavity of the backplate 92 by an aluminium front plate 94 which is secured by studs 96 to the backplate 92. The front plate 94 has a groove 98 in one face (FIGS. 20 and 21) and a back iron ring 100 is pressed into the groove 98. Coils 102 are bonded to the ring 100.

The casing 38 is secured to the plate 94 by bolts (not shown) passed through holes 94.1 in the plate 94 and into tapped sockets (not shown) which are in the rear wall of the casing 38.

The counterweight assembly 20 comprises two semi-circular plates 104 and 106 and a centre plate 108. The plate 104 has an arcuate recess 110 in it which receives a back iron 112, a magnetic isolator 112.1 of synthetic plastics material and a cage 114 which carries magnets 116. A further magnet 118 is secured to the plate 104. This co-operates with a Hall effect sensor (not shown) carried by the front plate 94.

The axle 18 forms part of a bearing structure 120 which is secured to the counterweight assembly 20. In use the counterweight does not rotate with the other components of the device and consequently the axle 18 is also a non-rotating component.

If reference is made to FIGS. 13 and 22 it will be seen that the back plate 92 has a boss 122 and that the outer race of a bearing 124 fits into this boss. Hence the end of the axle 18 (the right hand end as viewed in Figures such as FIG. 13) is mounted on the backplate 92 but does not rotate with it.

Between the front plate 94 and the axle 18 there is a bearing 126 which permits the plate 94 to rotate with respect to the static counterweight assembly 20 and axle 18 so that the coils 102 move relatively to the magnets 116.

The axle 18 has a key 128 (see FIG. 3) and the plate 22 has a keyway 130 (FIG. 12) which receives the key 128. The plate 22 consequently remains static along with the counterweight assembly 20 and the axle 18.

It will be understood from the above description that in operation the backplate 92 rotates with the vehicle's wheel hub. The plate 94, which is secured to the plate 92, rotates with the backplate 92. The casing 38 and the manifold 32, which are secured to one another and to the plate 94, consequently rotate with the plate 92.

Figure 4A:
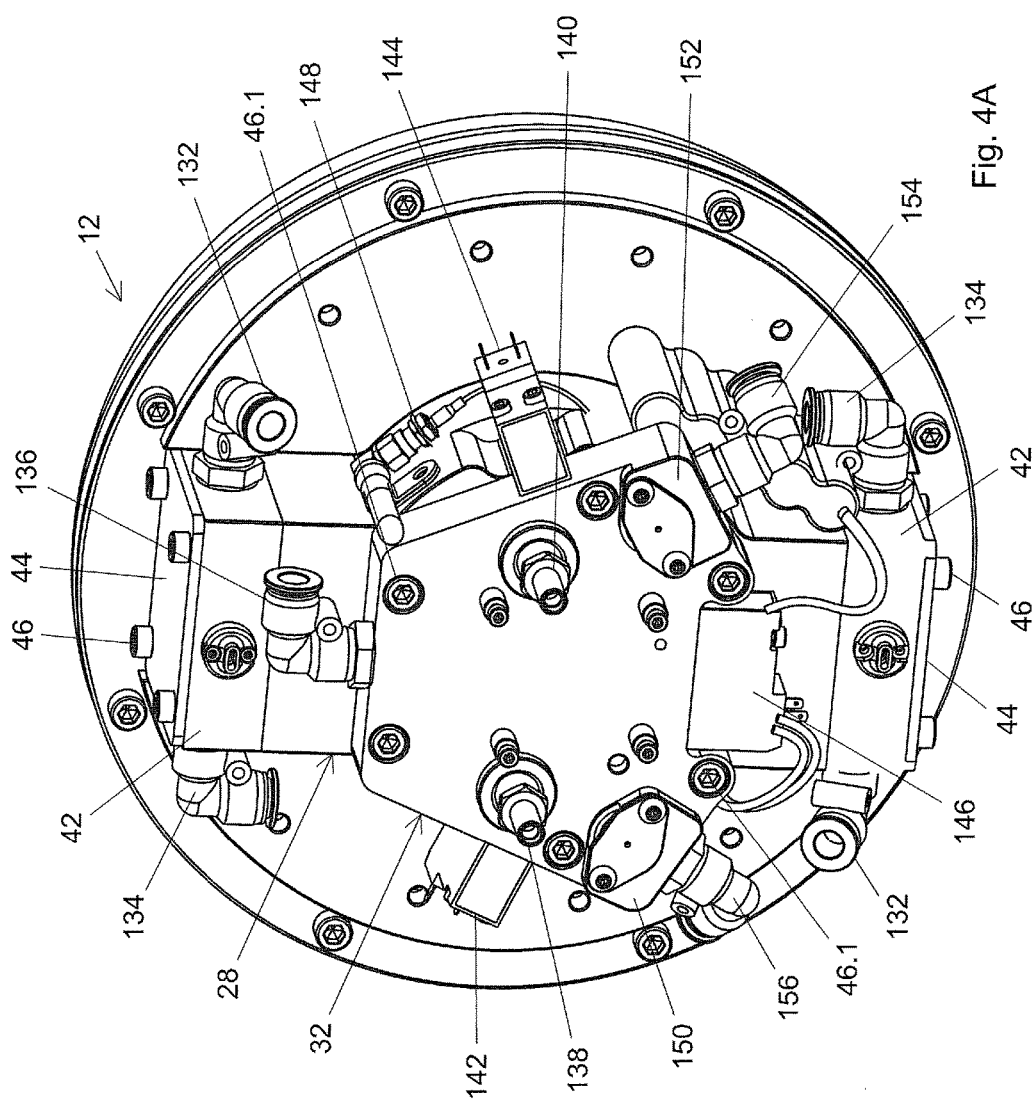
FIG. 4A is a view similar to FIG. 4 but illustrating a manifold and the parts associated therewith in more detail.
Figure 6:
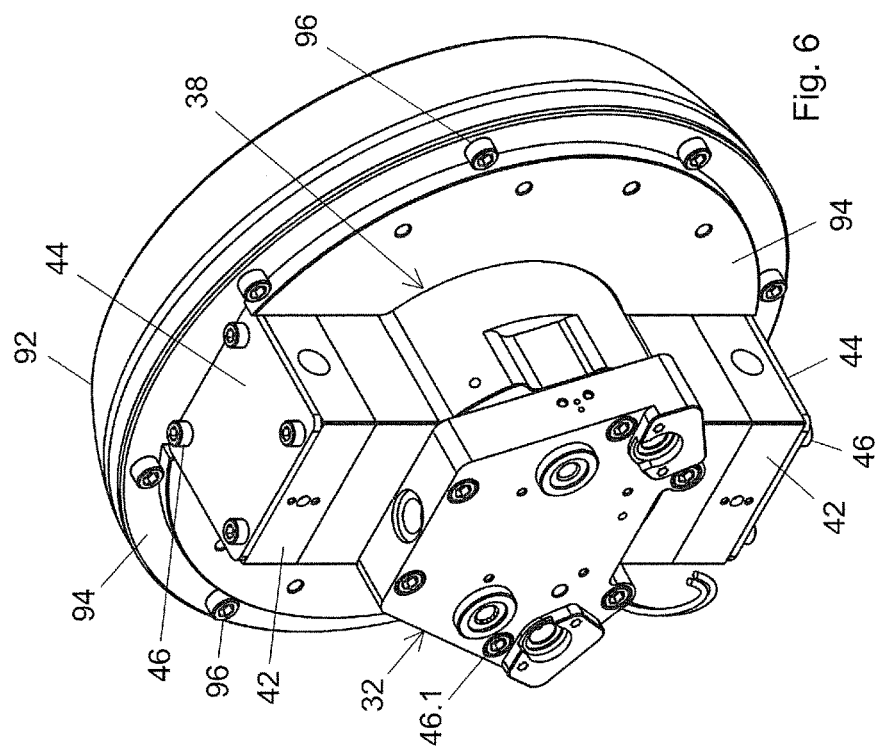
FIG. 6 is a view similar to that of FIG. 4 but with other components removed.
Figure 7:
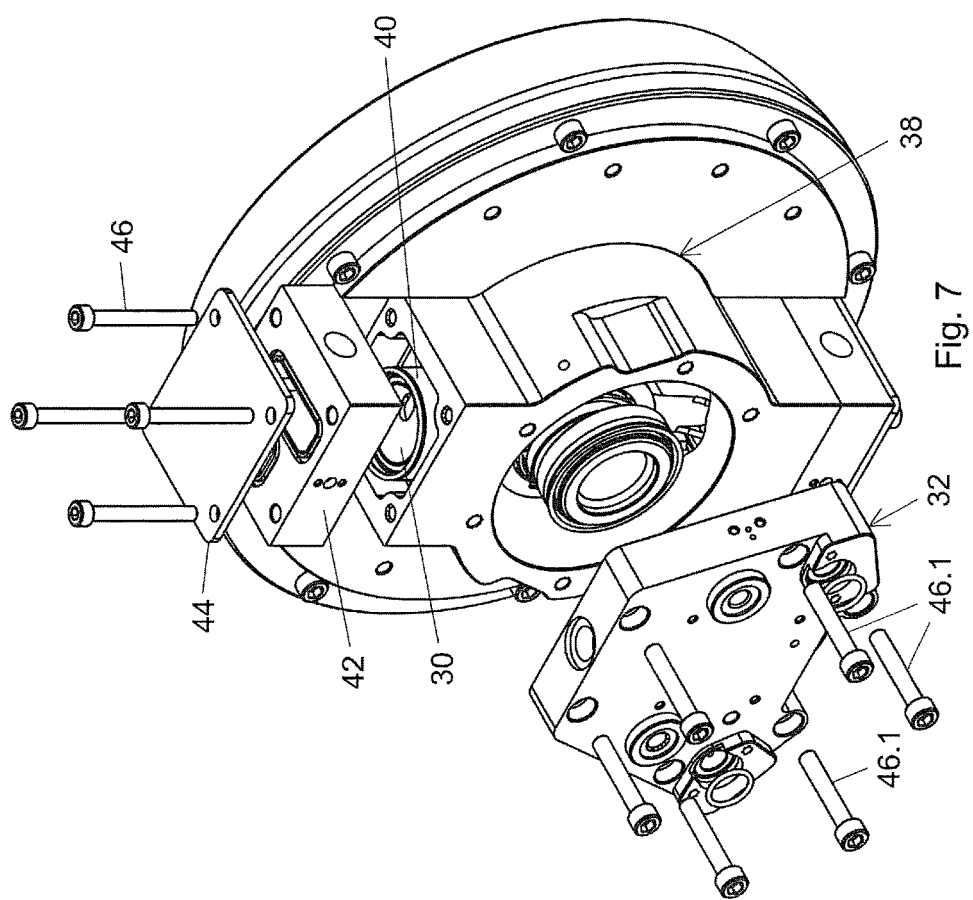
FIG. 7 is an "exploded" view corresponding to FIG. 6.

Referring now particularly to FIG. 4A, air under pressure emerges from the cylinder head 42 via a connector 132 when the pump is in operation. The air inlet connection to the cylinder head is shown at 134. There are one way valves in the cylinder head which ensure that air can only flow into the cylinder head via the connection 134 and out via the connector 132.

The inlet to the manifold 32 for air under pressure is designated 136. The connector 132, in use, is joined by a pipe (not shown) to the inlet 136.

Schrader valves designated 138 and 140 are shown in FIGS. 1, 2, 3, 4 and 4A. The Schrader valves are used to set the initial tyre pressure at a service station or workshop. This is done at a time when the truck is stationary and the pump is therefore not functioning. The Schrader valves can also be used at any other time when air needs to be supplied to the tyre from a source other than the device's pump, or when air pressure needs to be checked using an external pressure gauge.

The device further includes three electrically operated air valves designated 142, 144 and 146. The connections from the valves 142, 144 and 146 to the manifold 32 are not shown. Reference numeral 148 designates a radio antenna.

Pressure sensors 150, 152 are provided for sensing the pressure in a respective tyre and opening and closing the valves 142, 144 and 146 as is required to achieve the correct tyre pressure as is described below.

The elbow 154 in FIG. 4 A connects to one of the tyres of the double pair. The elbow 154 is connected through a passageway in the manifold 32 to the valve 144 and thence to the recess 82. The sensor 152 detects the pressure in this passageway and hence detects tyre pressure.

The Schrader valve 140 is connected via a passageway in the manifold to the passageway which leads from the elbow 154 to the valve 144. Consequently if air is supplied to the Schrader valve 140 it flows along the passageway to the elbow 154 and then through the external pipe connected between the elbow 134 and the tyre.

A second elbow 156 is also shown, this being for connection to the other tyre. The connections to the other tyre are shown to the left of FIG. 4A and replicate those described in the two preceding paragraphs.

The valve 146, when open, connects the recess 82 to atmosphere via a passageway in the manifold 32.

If one of the sensors 150, 152 detects that the tyre, the pressure, of which it is monitoring, has fallen a predetermined amount below the set pressure, the valve 142, 144 connected to that tyre opens, and the valve 146 closes. Air at tyre pressure consequently feeds through the manifold to the recess 82 and exerts a force on the piston 84. The piston 84 bears, via bearing 90, on the eccentric 26 and forces the eccentric 26 to the right as viewed in the drawings. The clutch plate 24 is pressed against the static friction material ring 66. The eccentric 26 immediately stops rotating as it is now clutched to the stationary plate 22. The inertia of the counterweight assembly 20 prevents the shock of clutch engagement from rotating the plate 12 and the axle 18.

In this condition of the device the stationary parts are the counterweight assembly 20, the axle 18, the plate 22 and the eccentric 26 of which the plate 24 forms a part. All other parts of the device are rotating with the vehicle's wheel hub.

The connecting rods 48 are reciprocated as the rings 50 rotate about the static eccentric 26. Air is pumped by the pistons 30 to the recess 82 of the manifold 32 and hence to the underpressure tyre via the respective valve 142, 144 which has remained open.

Upon the pressure sensor 150, 152 pertaining to that tyre detecting that the pressure is now at an acceptable level, the open valve 142, 144 closes and the valve 146 opens to vent the recess 82 to atmosphere. The disc spring 78 pushes against the bearing 70 and moves the clutch plate 24 away from the plate 22. The eccentric 26 is now free to rotate. Consequently relative rotation between the eccentric 26 and the rings 50 ceases and pumping stops.

If either pressure sensor detects a tyre overpressure, the appropriate valve 142, 144 opens. The normally open valve 146 remains open. Air flows from the tyre to the manifold 32 via the open valve 142 or 144 and through the open valve 146 to atmosphere.

Once the tyre pressure has fallen to the requisite level, the open valve 142 or 144 closes. The valve 146 remains open.

The magnet 118 and Hall effect sensor count the revolutions of the plate 94 and it will be understood this correlates with wheel speed. Opening of either valve 142, 144 to initiate pumping is delayed until the speed of the vehicle exceeds a predetermined minimum.

FIG. 24 is a diagrammatic representation of the electronic and other components of the tyre pressure controlling device. A rectifier for the power supply constituted by the coils 102 and magnets 116 is generally designated 158 and is used to charge cells 160 through the circuitry illustrated. These cells, via the regulators 162 and 164, provide power along the line 166 to the digital circuitry of the device and along the line 168 to the analogue circuitry of the device. Reference numeral 170 generally designates the interfaces which convert the analogue signals of the tyre pressure sensors 150, 152 to digital signals. A temperature sensor 172, which is mounted on the rear face of the back plate 92, detects the temperature of the wheel hub and the temperature sensor 174 senses the temperature of the printed circuit board 34. Further interfaces 176 convert the analogue signals of the sensors 172 and 174 to analogue form.

It is also possible to place a temperature sensor in a position such that air being vented from an over pressure tyre through the valve 146 impinges on it. The reading obtained is an indication of the temperature of the air in the tyre and of the tyre itself.

An accelerometer 182 is mounted on the board 34 to detect shocks caused by, for example, the wheel hitting a curb or something in the road. Discrimination circuits of the board 34 determine if the shock is sufficient to cause tyre casing damage and provide a warning to the vehicle's operator.

The microprocessor which controls the electronics of the device is designated 178. The valves 142, 144, 146 are also shown in FIG. 24.

The invention claimed is:

1. A device for controlling tire pressure, the device comprising a casing structure which in use rotates with the wheel hub, a counterweight assembly which is mounted on the casing structure by way of a bearing so that the counterweight assembly hangs and does not rotate with the casing structure, a fixed axle forming part of the counterweight assembly, a first clutch plate, the first clutch plate being fixed to said axle, a second clutch plate, the second clutch plate, in the device's non-pumping condition, rotating with said casing structure, means for detecting tire pressure, means for forcing said first and second clutch plates together to engage the clutch upon a tire "under pressure" being detected so that said second clutch plate stops rotating, and an air pump which rotates with said casing structure and which includes an air pumping piston and a pump driving element for reciprocating said piston to pump air to the tire only when said clutch is engaged, said element rotating with said casing structure whilst the clutch is disengaged, and first and second valves respectively for connection to the air inlets of the tires of a set of dual tires and a third valve for connection to atmosphere, all three valves being connected through a manifold to a chamber one bounding wall of which is in the form of an activating piston which, on said chamber being pressurized, moves to force said first and second clutch plates together.

2. A device as claimed in claim 1, wherein said second clutch plate is integral with an eccentric through which said fixed axle passes, and there is a thrust bearing between said activating piston and the end of said eccentric.

3. A device as claimed in claim 2, wherein the air pumping piston of the air pump includes a piston rod which has a ring at the end thereof remote from the piston, said eccentric being within said ring and constituting said pump driving element.

4. A device as claimed in claim 2 and including spring means between said clutch plates for holding the clutch plates apart in the non-pumping condition.

5. A device as claimed in claim 1 and including spring means between said clutch plates for holding the clutch plates apart in the non-pumping condition.

6. A device as claimed in claim 1, and including a plurality of coils carried by the casing structure and a plurality of magnets carried by the counterweight assembly, the magnets and coils constituting an alternator.

7. A device as claimed in claim 1 and including a monitor for detecting the rate of rotation of the wheel hub and means for preventing activation of said means for forcing said clutch plates together until a preset minimum rate of rotation has be reached.

8. A device as claimed in claim 7, wherein said monitor comprises a Hall effect switch which is carried by the casing structure, a magnet which is carried by the counterweight assembly, and means for counting the rate of activation of the Hall effect switch.

9. A device as claimed in claim 1 and comprising an air flow control valve for connection to a tire, a tire pressure sensor for opening said valve upon the sensor detecting that the tire pressure is below a predetermined value, a chamber and a piston forming one wall of said chamber, opening of said valve permitting air at tire pressure to enter the chamber and move said piston which piston constitutes the means for forcing the first and second clutch plates together to initiate pumping.

10. A device as claimed in claim 9 and including a further air flow control valve which is opened by said sensor to connect the tire to atmosphere via said chamber upon the sensor detecting that the tire pressure is above a predetermined maximum value.

11. A device as claimed in claim 9 and comprising a second air flow control valve and a second tire pressure sensor whereby the device is adapted to control the pressure in the tires of a set of dual tires.

12. A device as claimed in claim 1 and including spring means between said clutch plates for holding the clutch plates apart in the non-pumping condition.

13. A device for controlling a vehicle's tire pressure, the device comprising a microprocessor, a first pressure sensor for detecting the pressure in a first tire of a set of dual tires and feeding signals representative of detected tire pressure to said microprocessor, a second pressure sensor for detecting the pressure in a second tire of the set of dual tires and feeding signals representative of detected tire pressure to said microprocessor, a manifold, a first electrically operated valve for connection between said first tire and the manifold, a second electrically operated valve for connection between said second tire and the manifold, means for engaging a pump upon one of said pressure sensors detecting a tire pressure below a predetermined value to pump air to said manifold and for opening the respective one of said first and second valves so that air can flow from the manifold to the below pressure tire, and a third electrically operated valve for connecting said manifold to atmosphere to evacuate said manifold upon the pressure of said below pressure tire reaching the requisite value.

14. A device as claimed in claim 13 characterised by means for detecting the road speed of a vehicle and feeding a signal representative of vehicle road speed to the microprocessor, said pump being prevented from engaging until the detected road speed exceeds a predetermined value.

15. A device as claimed in claim 13, wherein said first, second and third valves are solenoid valves and wherein a dual voltage power supply is provided, a higher voltage being supplied to shift the solenoid of a valve between the open and closed positions of the valve and a lower voltage being supplied to hold the solenoid in the position to which it has been shifted.

16. A device as claimed in claim 13 characterised by an accelerometer for detecting vibrations and for feeding to the microprocessor signals representative of the detected vibrations and characterised in that the microprocessor produces an alarm signal when a vibration of greater than a predetermined magnitude is detected.

17. A device as claimed in claim 13, characterised by a printed circuit board and a temperature sensor for sensing the temperature of the printed circuit board and feeding a signal to the microprocessor which is indicative of the temperature of the board.

18. A device as claimed in claim 13, characterised by a temperature sensor for sensing the temperature of the hub on which said dual tires are mounted and feeding a signal to the microprocessor which is indicative of the temperature of the hub.

19. A device as claimed in claim 13 and including a radio frequency transmitter.

* * * * *